United States Patent
Luo

(10) Patent No.: US 7,263,703 B2
(45) Date of Patent: Aug. 28, 2007

(54) OPTICAL REPRODUCING/RECORDING APPARATUS

(75) Inventor: Wen Luo, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 435 days.

(21) Appl. No.: 10/855,296

(22) Filed: May 26, 2004

(65) Prior Publication Data
US 2004/0244022 A1    Dec. 2, 2004

(30) Foreign Application Priority Data
May 26, 2003 (CN) ................. 03 2 26627

(51) Int. Cl.
*G11B 33/14*    (2006.01)
(52) U.S. Cl. .................................... 720/648
(58) Field of Classification Search ........ 720/648, 720/652; 361/685; 360/97.02
See application file for complete search history.

(56) References Cited
U.S. PATENT DOCUMENTS 6,141,311 A      10/2000  Huang
6,198,712 B1 *   3/2001  Okamoto ................. 720/648
6,445,663 B1 *   9/2002  Chen et al. .............. 720/652
6,567,361 B1     5/2003  Ohmori
6,853,549 B2 *   2/2005  Xu .......................... 361/685
6,885,550 B1 *   4/2005  Williams ................. 361/685
7,000,309 B1 *   2/2006  Klassen et al. .......... 29/603.03
2002/0048247 A1* 4/2002  Ahn ........................ 369/77.1

FOREIGN PATENT DOCUMENTS

JP        07045060 A  *  2/1995

* cited by examiner

Primary Examiner—Tianjie Chen
(74) Attorney, Agent, or Firm—Wei Te Chung

(57) ABSTRACT

An optical reproducing/recording apparatus (100) has a core (1), a frame (2), a top cover (4), a bottom cover (5), a drawer (3), a front panel (7) and anti-dust elements (61-65). The top and bottom covers, the frame, and the front panel engage each other to form an enclosure enclosing the core. At least one of the top and bottom covers has a plurality of position holes (431) by which the reproducing/recording apparatus is fixed in a computer. The anti-dust elements are attached to the at least one cover and drawer and cover the position holes and gaps.

17 Claims, 4 Drawing Sheets

OPTICAL REPRODUCING/RECORDING APPARATUS

BACKGROUND OF THE INVENTION

1. Field of the Invention

The present invention generally relates to optical reproducing/recording apparatuses, and more particularly to an optical reproducing/recording apparatus used in a personal computer.

2. Description of Prior Art

A conventional optical reproducing/recording apparatus uses an optical pickup head for reproducing signals from/recording signals on an optical disk which is positioned on a turntable. Dust is very harmful to operation of the optical reproducing/recording apparatus. When a signal surface of the optical disk is covered by dust, a laser from the optical pickup head may fail to track and focus on a signal track of the optical disk. Furthermore, when the optical pickup head is covered by dust, the intensity of a laser from the optical pickup head becomes weak, thus performance of the reproduced/recorded signals is reduced. Moreover, dust can increase friction between elements of the optical reproducing/recording apparatus.

An optical reproducing/recording apparatus with an arrangement for avoiding dust invasion is desired.

SUMMARY OF THE INVENTION

Accordingly, an object of the present invention is to provide an optical reproducing/recording apparatus with an arrangement for avoiding dust invasion.

To achieve the above object, an optical reproducing/recording apparatus in accordance with the present invention comprises a core, a frame, a top cover, a bottom cover, a drawer, a front panel, and at least an anti-dust element. The core has a chassis, a turntable, an optical pickup head and a driving device. The turntable and the driving device are fixed on the chassis. The optical pickup head is slidingly positioned on the driving device. The top and bottom covers, the frame, and the front panel engage each other to form an enclosure enclosing the core. At least one of the top and bottom covers has a plurality of position holes by which the reproducing/recording apparatus is fixed in a computer. The anti-dust elements are attached to the at least one cover and drawer and cover the position holes and gaps.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
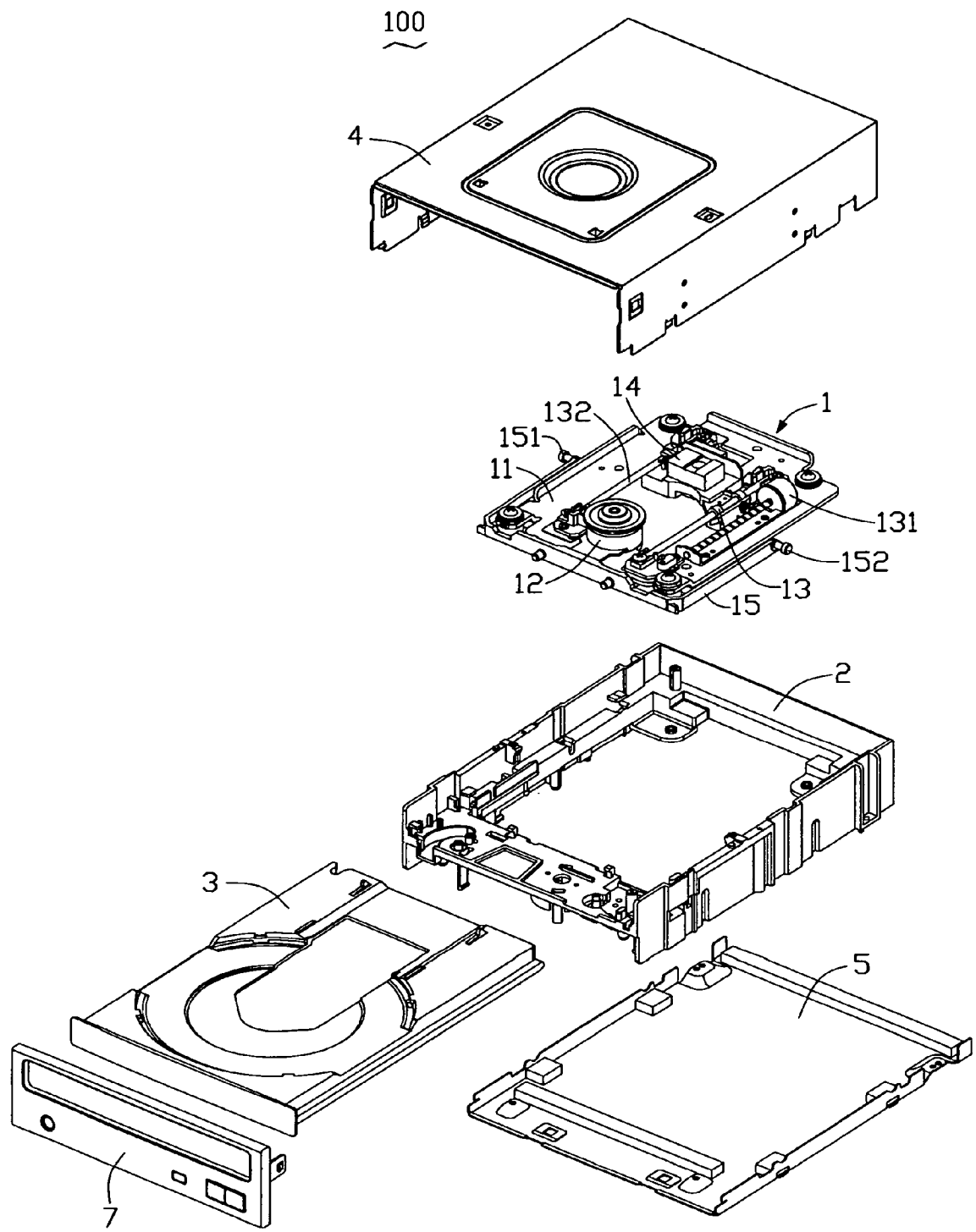
FIG. 1 is an exploded view of an optical reproducing/recording apparatus in accordance with the present invention.

Referring to FIGS. 1-5, an optical reproducing/recording apparatus 100 in accordance with the present invention has a core 1, a frame 2, a drawer 3, a top cover 4, a bottom cover 5 and a front panel 7. The core 1 and the drawer 3 are positioned on the frame 2. The top and bottom covers 4, 5 engage each other to form an enclosure for enclosing the core 1, the frame 2 and the drawer 3. The front panel 7 is fixed on the top cover 4.

The core 1 has a chassis 11, a turntable 12, a driving device 13 and an optical pickup head 14. The turntable 12 and the driving device 13 are fixed on the chassis 11. The driving device 13 has a driving subassembly 131 and two guide rails 132. The optical pickup head 14 is slidingly positioned on the two guide rails 132 of the driving device 13, and mates with the driving subassembly 131 of the driving device 13. When the optical reproducing/recording apparatus 100 operates, the turntable 12 rotates an optical disk (not shown) positioned thereon, and the driving subassembly 131 drives the optical pickup head 14 to a predetermined position for reproducing signals from/recording signals on the optical disk. Two arms 15 respectively extend from two sides of the chassis 11. The arms 15 respectively have a rear end portion 151, 152 and a front end portion (not labeled). The front end portion of each arm 15 connects with the chassis 11. The rear end portions 151, 152 respectively have a pivot (not labeled) for engaging recesses 221 of the frame 2.

Figure 2:
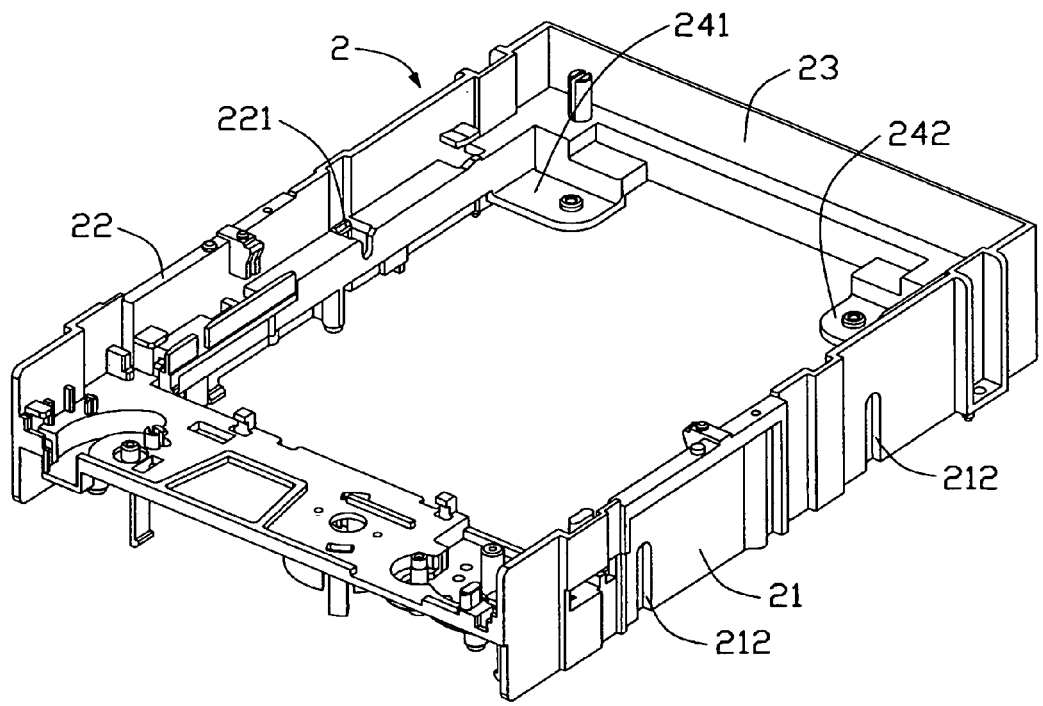
FIG. 2 is a perspective view of a frame of the optical reproducing/recording apparatus shown in FIG. 1.

Referring to FIG. 2, the frame 2 has two opposite side walls 21, 22 and a third wall 23. The third wall 23 connects the two side walls 21, 22, and is perpendicular to the side walls 21, 22. Two supporting tables 241, 242 respectively extend from joints of the third wall 23 and the two side walls 22, 21. A rear end (not labeled) of the chassis 11 of the core 1 is fixed on the supporting tables 241, 242 of the frame 2 by screws (not shown). The recesses 221 are respectively defined in an inner surface (not labeled) of each side wall 21, 22, and accommodate the pivot of each end portion 151,152 of the arms 15. The core 1 can swing by the rotation of the pivots in the recesses 221. Two slots 212 are defined in an outer surface of each side wall 21, 22.

Figure 3:
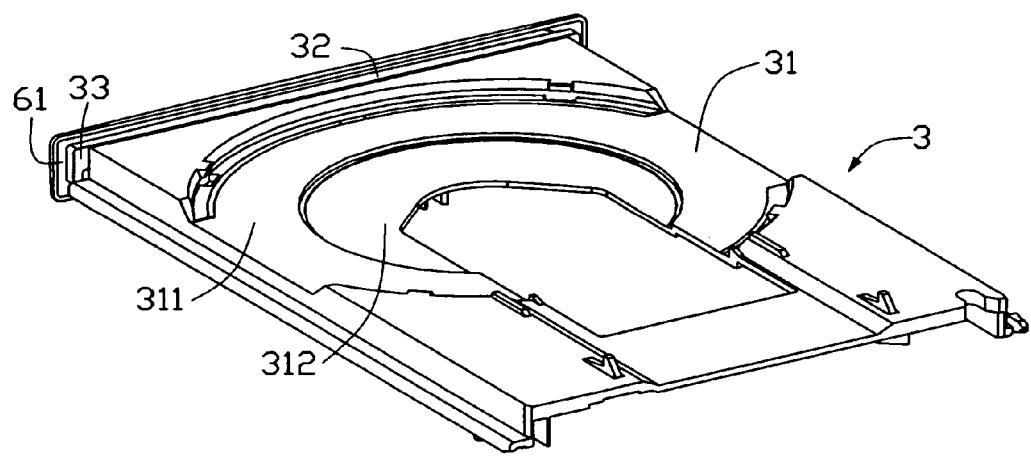
FIG. 3 is a perspective view of a drawer of the optical reproducing/recording apparatus shown in FIG. 1.

Referring to FIG. 3, the drawer 3 has a body 31 and a retainer plate 32 connected with the body 31. The body 31 has a first and second supporting surfaces 311, 312 for supporting an optical disk. The first and second supporting surfaces 311, 312 each have a different diameter for supporting different sized optical disks. The retainer plate 32 is perpendicular to the body 31. A length of the retainer plate 32 is slightly greater than a width of the body 31 of the drawer 3. A width of the retainer plate 32 is slightly greater than a thickness of the body 31 of the drawer 3. The retainer plate 32 has an engaging portion 33 by which the retainer plate 32 is engaged with the body 31 of the drawer 3. A first anti-dust element 61 is positioned on an inner surface (not labeled) of the retainer plate 32 and fits around the engaging portion 33. The first anti-dust element 61 prevents dust invasion through gaps (not shown) between the drawer 3 and the front panel 7. The first anti-dust element 61 is glued to the inner surface of the retainer plate 32 or a surface of the engaging portion 33.

Figure 4:
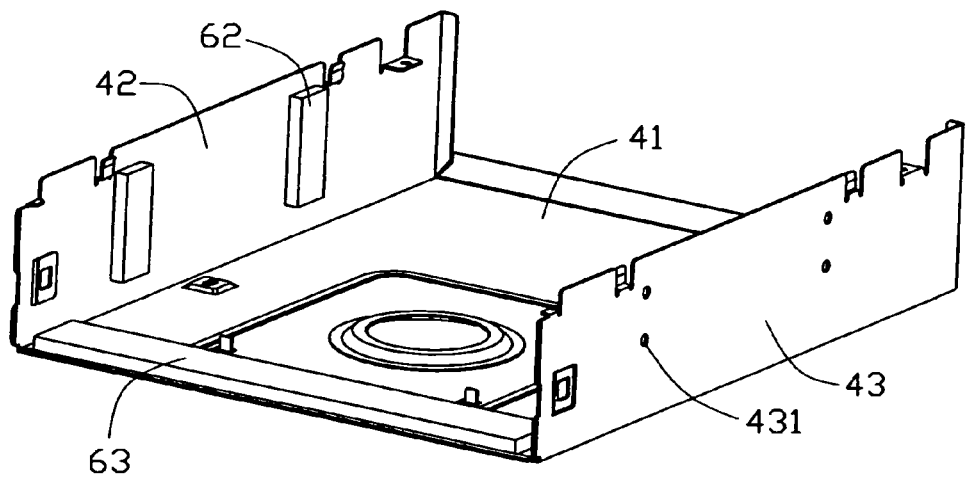
FIG. 4 is a perspective view of a top cover of the optical reproducing/recording apparatus shown in FIG. 1.

Referring to FIG. 4, the top cover 4 has a base 41 and two side walls 42, 43 respectively perpendicularly extending from two sides of the base 41. Each side wall 42, 43 has a plurality of position holes 431 defined therethrough by which the optical reproducing/recording apparatus 100 can be fixed in a computer (not shown). A plurality of second anti-dust elements 62 are glued to an inner surface (not labeled) of the side walls 42, 43, and cover the position holes of the side walls 42, 43. A third anti-dust element 63 is glued to an inner surface of a front end of the base 41, said front end being adjacent to the front panel 7 when the front panel 7 is assembled to the top cover 7. The third anti-dust element 63 is cuboidal-shaped, and a length of the third anti-dust element 63 is slightly less than a width of the base 41.

When the top cover 4 mates with the frame 2, the position holes 431 of the top cover 4 respectively face the corresponding slots 212 of the frame 2, and the second anti-dust elements 62 are respectively sandwiched between the position holes 431 and the slots 212 and are partially accommodated in the corresponding slots 212 of the frame 2. The second anti-dust elements 62 prevent most dust from entering into the optical reproducing/recording apparatus 100 through the position holes 431. The remaining dust which does enter from the position holes 431 moves towards the slot 212 by inertia, and resides on the second anti-dust elements 62 or finally falls into the slot 212. When the optical reproducing/recording apparatus 100 is assembled, the front end of the optical reproducing/recording apparatus 100 is not tightly sealed. The third anti-dust element 63 prevents dust from entering through gaps (not shown) at a front end of the optical reproducing/recording apparatus 100 into the optical reproducing/recording apparatus 100. The third anti-dust element 63 can also isolate noise produced by the optical reproducing/recording apparatus 100.

Figure 5:
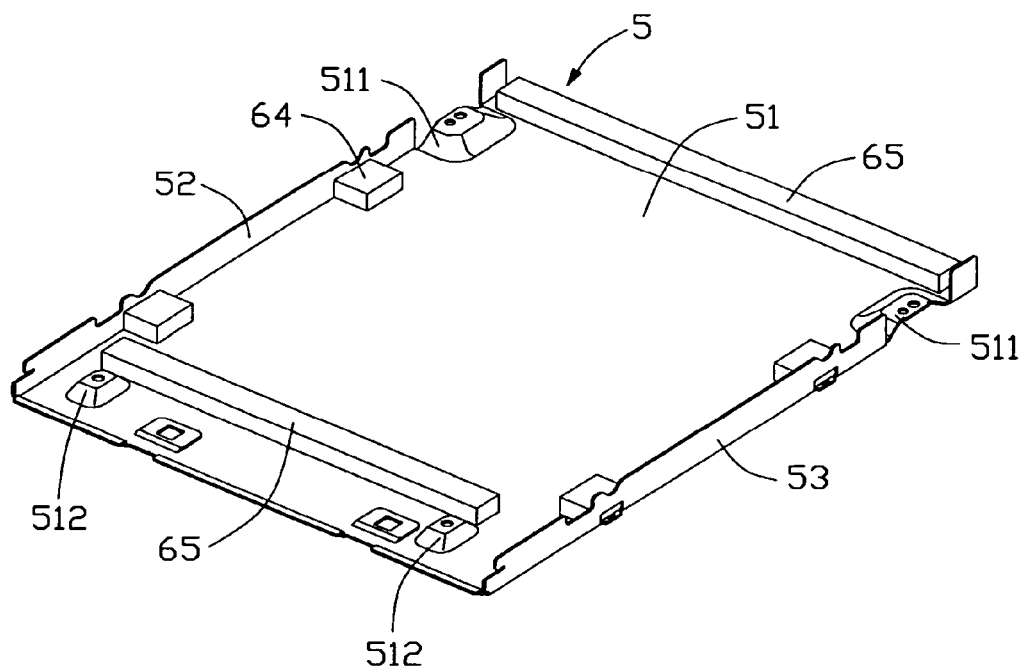
FIG. 5 is a perspective view of a bottom cover of the optical reproducing/recording apparatus shown in FIG. 1.
Figure 6:
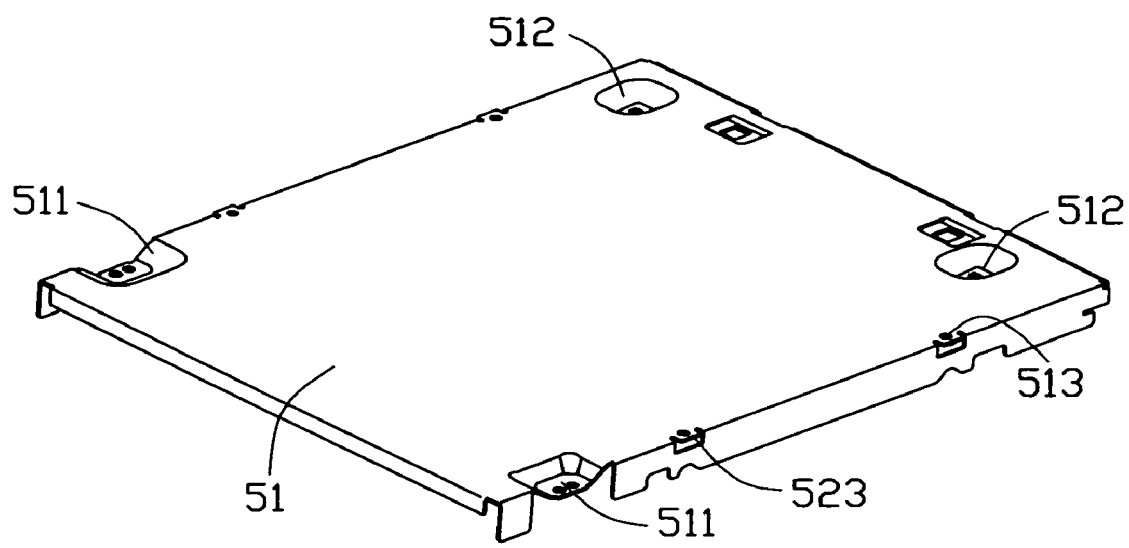
FIG. 6 is a perspective view of the bottom cover shown in FIG. 5, shown from another aspect.

Referring to FIGS. 5 and 6, the bottom cover 5 has a base plate 51 and a first and second side walls 52, 53 perpendicularly extending from two sides of the base plate 51. Two first recesses 511 are stamped at two sides of a rear portion of the base plate 51. Two second recesses 512 are stamped at two sides of a front portion of the base plate 51. A printed circuit board (not shown) is fixed between the frame 2 and the bottom cover 5 by screws (not shown) screwing through the first and second recesses 511, 512. Since the first and second recesses 511, 512 are formed by stamping technology, no gap is located between the recesses and the base plate. Referring to FIG. 6, the bottom cover 5 has two spaced second position holes 513 defined through each side of the bottom cover 5. Four second slots 523 are defined in the side walls 52, 53, each second slot 523 being adjacent to a corresponding second position hole 513. A plurality of fourth anti-dust elements 64 are glued to the base plate 51 of the bottom cover 5, each fourth anti-dust element 64 covering the corresponding second position hole 513 and the corresponding second slot 523. The fourth anti-dust elements 64 prevent dust from entering into the optical reproducing/recording apparatus 100 though the second slots 523 and the second position holes 513. Two fifth anti-dust elements 65 are respectively glued to two ends of the base plate 51 of the bottom cover 5, and a length of each fifth anti-dust element 65 is slightly less than a width of the base plate 51 of the bottom cover 5. The fifth anti-dust elements 65 prevent dust from entering into the optical reproducing/recording apparatus 100 through gaps (not shown) between the bottom cover 5 and the frame 2. The fifth anti-dust elements 65 also can isolate noise of the optical reproducing/recording apparatus 100.

Compared with conventional reproducing/recording apparatuses, the optical reproducing/recording apparatus 100 in accordance with the present invention has a plurality of anti-dust elements 61, 62, 63, 64, 65 to avoid dust invasion, thus optimizing the performance of the optical recording apparatus 100.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. A reproducing/recording apparatus comprising:
   a core comprising a chassis, a turntable, an optical pickup head and a driving device, the turntable and the driving device being fixed on the chassis, the optical pickup head being positioned on the driving device;
   a frame comprising two side walls, at least one side wall having a corresponding outer surface and at least one slot defined in the corresponding outer surface;
   a first cover;
   a second cover; and
   at least one first anti-dust element;
   wherein the core is positioned on the frame, the first and second covers engage each other to form an enclosure enclosing the core and the frame, at least a cover has a plurality of position holes by which the reproducing/recording apparatus is installed in an electronic device, the at least one first anti-dust element is attached to one or more of the covers and covers the position holes, the at least one slot correspondingly faces the at least one position hole, and the at least one first anti-dust element is partially accommodated in the at least one slot.

2. The reproducing/recording apparatus in accordance with claim 1, further comprising a drawer with a body and a retainer plate, said retainer plate being attached to the body and being perpendicular to the body.

3. The reproducing/recording apparatus in accordance wit claim 2, further comprising at least one second anti-dust element glued to an inner surface of the retainer plate.

4. The reproducing/recording apparatus in accordance wit claim 1, wherein the first cover has a base and two side walls perpendicularly extending from two sides of the base.

5. The reproducing/recording apparatus in accordance with claim 4, further comprising at least one third anti-dust element glued to an inner surface of the base of the first cover.

6. The reproducing/recording apparatus in accordance with claim 1, wherein the second cover comprising a base portion and two side walls perpendicularly extending from two sides of the base portion.

7. The reproducing/recording apparatus in accordance with claim 6, further comprising at least one fourth anti-dust element glued to an inner surface of the base portion of the second cover.

8. The reproducing/recording apparatus in accordance with claim 1, wherein each anti-dust element is an elastic element.

9. A reproducing/recording apparatus comprising:
   a first cover;
   a second cover cooperating with the first cover to define an enclosure to receive a core and a frame having two side walls, at least one side wall having a corresponding outer surface and at least one slot defined in the corresponding outer surface; and
   at least one first anti-dust element;
   wherein at least one cover has a plurality of position holes by which the core and the frame are installed in the enclosure, and at least one first anti-dust element is attached to one or more of the covers and covers the position holes, the at least one slot correspondingly faces the at least one position hole, and the at least one first anti-dust element is partially accommodated in the at least one slot.

10. The reproducing/recording apparatus in accordance with claim 9, wherein the at least one anti-dust element is located inside the corresponding cover.

11. The reproducing/recording apparatus in accordance with claim 9, further comprising a drawer with a body and a retainer plate, said retainer plate being attached to the body and being perpendicular to the body.

12. The reproducing/recording apparatus in accordance with claim 11, further comprising at least one second anti-dust element glued to an inner surface of the retainer plate.

13. The reproducing/recording apparatus in accordance with claim 9, wherein the first cover has a base and two side walls perpendicularly extending from two sides of the base.

14. The reproducing/recording apparatus in accordance wit claim 13, further comprising at least one third anti-dust element glued to an inner surface of the base of the first cover.

15. The reproducing/recording apparatus in accordance with claim 14, wherein the second cover comprising a base portion and two side walls perpendicularly extending from two sides of the base portion.

16. The reproducing/recording apparatus in accordance with claim 15, further comprising at least one fourth anti-dust element glued to an inner surface of the base portion of the second cover.

17. The reproducing/recording apparatus in accordance with claim 9, wherein each anti-dust element is an elastic element.

* * * * *